Nov. 30, 1926.  
M. M. VESSER  
1,608,685  
MEANS FOR DEMONSTRATING THE EFFECT OF ARTIFICIAL LIGHT  
Filed Sept. 21, 1925
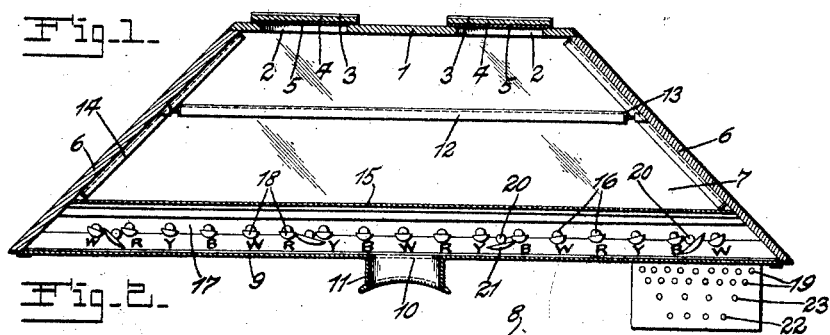
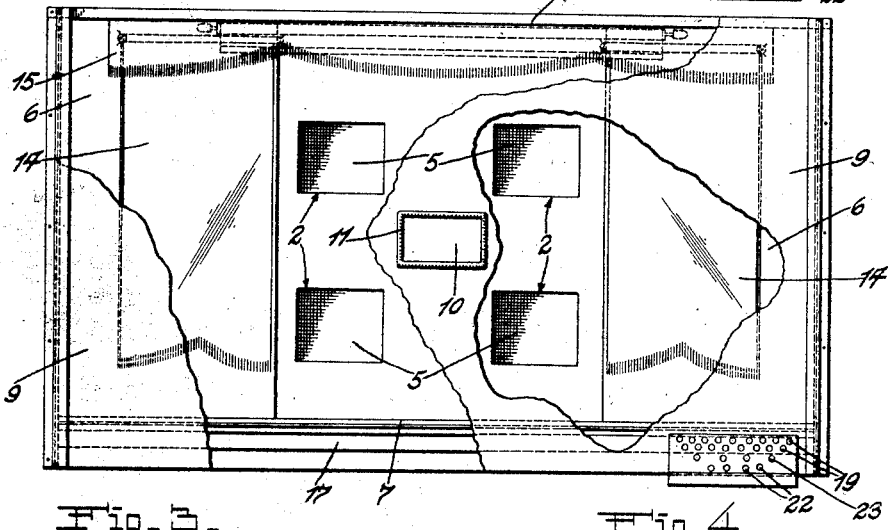
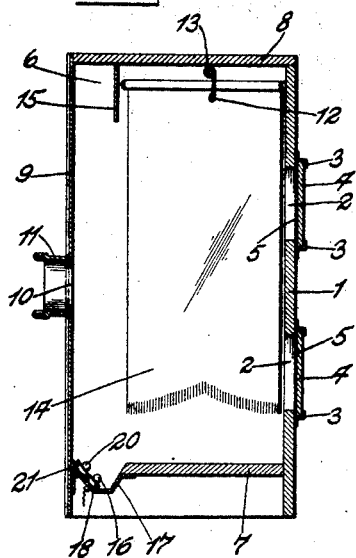
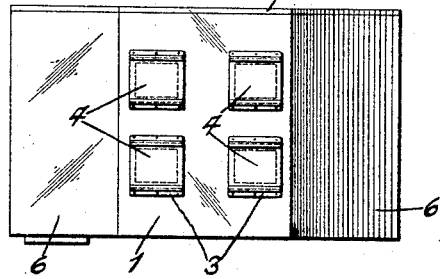
Inventor:
Mary M. Vesser,
by Rippey Kingsland,
Her Attorneys.

Patented Nov. 30, 1926.

1,608,685

UNITED STATES PATENT OFFICE.

MARY M. VESSER, OF COLUMBIA, MISSOURI.

MEANS FOR DEMONSTRATING THE EFFECT OF ARTIFICIAL LIGHT.

Application filed September 21, 1925. Serial No. 57,590.

This invention relates to means for demonstrating the effects of different colors and combinations of colors of artificial light on textiles of the different fibers and different colors in environments of different colors.

An object of the invention is to provide means for demonstrating the effect of artificial light of different colors and combinations of colors on textiles of different colors, fibers and weaves in environments of different colors, and thus afford opportunity to observe and select the color, weave, and class of cloth most suitable for costumes on different types of individuals or for decorative uses, and to show the cellular structure of the four fibers used in textiles; to display visually the effect of artificial light on the chemical and physical properties of fabrics including the weighting of silks, dyeing, mercerization and finishing processes; to show the effect of light on the texture of materials in order to enable one to observe the effect of the different materials and different colors of materials on different types of individuals; and generally to provide means for observation of the effect of artificial lights of different colors used selectively, or concurrently and interchangeably in series, such variations in the combinations of colors being obtained optionally.

Other objects will appear from the following description, reference being made to the accompanying drawing illustrating an embodiment of the invention in which Fig. 1 is a horizontal cross sectional view of a stage or enclosure comprising the invention.

Fig. 2 is a front elevation with portions of the opaque front wall or curtain broken away.

Fig. 3 is a vertical front to rear cross sectional view.

Fig. 4 is a reduced rear elevation.

In the embodiment of the invention shown there is a portable miniature stage or enclosure provided on one side with means for supporting the textile or other materials which are to be subjected to the effects of artificial lights of different colors and different combinations of colors which lights, in the present instance, comprise electric lamps of different colors controlled by selectively operable individual switches and selectively operable dimmers, so that the different colors and combinations of colors may be selectively used and the effects thereof upon the fabrics may be observed.

The stage or enclosure comprises an opaque rear wall 1 provided with openings 2 having guides 3 for receiving and supporting slides 4 having the sections 5 of textile or other fabricated materials upon which the effects of different colors and combinations of colors of artificial lights are to be observed. As shown, provision is made whereby textile materials composed respectively of the four fibers used in textiles (cotton, silk, hemp and wool) may be simultaneously observed under the same lights, to make clear their different properties and contrasts and the effects of lights of different colors thereon. The forwardly extended diverging opaque side walls 6 have their vertical rear edges closely connected with the vertical side edges of the rear wall 1 so as to prevent all outside light from passing through such connection to the stage or enclosure. An opaque bottom wall or stage floor 7 and an opaque top wall 8 are connected to the upper ends of the rear wall and side walls in such a way as to prevent all outside light from passing through such connection to the interior of the stage or enclosure. A removable opaque front wall or curtain 9 has its edges closely contacting with the edges of the top, bottom and side walls, respectively, and excludes all outside light from the interior of the stage or enclosure, except such as may enter through an observation window or opening 10 which is surrounded by a frame 11 in and against which the face of the observer is pressed so as to exclude outside light from the interior during observation of the effects of the various colors and combinations of colors of artificial lights upon the material 5 and the environments.

A proper environment is obtained by a removable and replaceable curtain 12 having the color of a part of the surroundings in which it is desired to observe the effects of the artificial lights on the materials 5. The curtain 12 is supported by a roller 13 permitting the curtain 12 to be raised and lowered to different adjustments to obtain best results, as will be readily understood; by interchangeable vertically adjustable curtains or draperies 14 selected to conform to the environment color to which the effects of the lights on the materials 5 are to be compared for purposes of selection of costume or decoration; and by a valance 15 of similarly selected color between the curtain 12 and the front wall 9.

The electric lamps 16 are arranged in a transverse row in a depression 17 between the front edge of the floor 7 and the wall 9 and have reflectors 18 arranged to project the light rays directly upon the material 5. The lamps 16 are in series, the lamps of each series comprising preferably a white, a red, a yellow and a blue lamp, the colors of the lamps of each series, as shown, being designated by letters W, R, Y and B, respectively. Lamps of different colors or tints may be used. The circuit of each of the lamps 16 is controlled by an individual switch 19 of known construction, connection and operation so that the lights can be used individually or in any different combinations desired. This also permits one or more lamps from one or more of the series of lamps to be used at one time so that any combination and relationship of colors from the series of lamps may be used.

The invention also comprises a series of spot light lamps 20 and their reflectors 21 arranged adjacent to the series of lamps 16 and arranged to project the light rays therefrom directly against the material 5 in the openings 2.

The lamps 20 comprise the colors white, red, yellow and blue, and are individually controllable by switches 22 of known construction, application and operation, so that they may be used with the lamps 16 as above described, or independently thereof as desired.

Each series of lamps 16 is controlled by a dimmer device 23 of known construction and application, whereby the brilliancy of illumination may be varied as desired.

The dimensions of the device and the relationship of the parts may be varied otherwise than as specifically mentioned without departure from the principle of the invention. I do not restrict myself unnecessarily, but what I claim and desire to secure by Letters Patent is:—

1. A device of the character described comprising an enclosure having opaque walls one of which is provided with an opening and another of which walls is provided with an observation opening, means for supporting a section of textile material across said first named opening and preventing outside light from passing through the opening, a series of electric lamps of different colors within said enclosure arranged to illuminate said textile material, switches controlling said lamps individually, and dimmers for said lamps.

2. A device of the character described comprising an enclosure composed of opaque walls one of which has a number of openings therethrough and another of which walls is provided with an observation opening, means for supporting a section of textile material transversely of each of said first named openings and preventing outside light from passing through said openings respectively, series of electric lamps within the enclosure of which the lamps of each series are of different colors, switches for controlling the lamps individually, and a spot light within the enclosure arranged to cast its rays directly at one of said sections of textile material.

3. A device of the character described comprising an enclosure composed of opaque walls one of which has a number of openings therethrough and another of which walls is provided with an observation opening, means for supporting a section of textile material transversely of each of said first named openings and preventing outside light from passing through said openings respectively, series of electric lamps within the enclosure of which the lamps of each series are of different colors, switches for controlling the lamps individually, and a series of spot lights in said enclosure which are arranged to cast their rays respectively upon said sections of textile material.

4. A device of the character described comprising an enclosure composed of opaque walls one of which has a number of openings therethrough and another of which walls is provided with an observation opening, means for supporting a section of textile material transversely of each of said first named openings and preventing outside light from passing through said openings respectively, series of electric lamps within the enclosure of which the lamps of each series are of different colors, switches for controlling the lamps individually, and a series of spot lights in said enclosure which are arranged to cast their rays respectively upon said sections of textile material concurrently with or independently of said lamps.

5. A device of the character described comprising an enclosure having opaque walls one of which is provided with a number of openings, means for supporting a section of textile material in each of said openings and preventing outside light from passing through said opening, and another of which wall has an observation opening therethrough, series of electric lamps in said enclosure of which the lamps of each series are of different colors, switches for controlling said lamps individually, dimmers for controlling the respective series of lamps, and removable and replaceable decorations of selected colors supported in said enclosure in a desired relationship to each other and to said sections of textile material.

6. A device of the character described comprising an enclosure having opaque walls one of which is provided with a number of openings and another of which walls is provided with an observation opening, means for supporting a section of textile material in each of said openings and preventing outside light from passing through said opening, and another of which walls has an observation opening therethrough, series of electric lamps in said enclosure of which the lamps of each series are of different colors, switches for controlling said lamps individually, dimmers for controlling the respective series of lamps, removable and replaceable decorations of selected colors supported in said enclosure in a desired relationship to each other and to said sections of textile material, and spot lights in said enclosure arranged to illuminate said sections of textile material respectively.

7. A device of the character described comprising an enclosure having opaque walls one of which is provided with an observation opening, means for supporting a section of textile material on the wall opposite from said opening, a series of electric lamps of different colors within said enclosure arranged to illuminate said textile material, switches controlling said lamps individually, and dimmers for said lamps.

MARY M. VESSER.